(12) United States Patent
Burns et al.

(10) Patent No.: US 8,714,488 B2
(45) Date of Patent: May 6, 2014

(54) ELASTIC AIRCRAFT JOINT FAIRING

(75) Inventors: Richard W. Burns, Edwardsville, IL (US); Daryl Tryson, St. Louis, MO (US); Michael F. McCracken, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 1519 days.

(21) Appl. No.: 12/350,501

(22) Filed: Jan. 8, 2009

(65) Prior Publication Data

US 2010/0170994 A1  Jul. 8, 2010

(51) Int. Cl.
 *B64C 1/06* (2006.01)
 *B63C 7/00* (2006.01)
 *F16J 15/02* (2006.01)
 *F16J 15/12* (2006.01)

(52) U.S. Cl.
 CPC . *B64C 1/069* (2013.01); *B63C 7/00* (2013.01); *F16J 15/021* (2013.01); *F16J 15/022* (2013.01); *F16J 15/128* (2013.01); *F16J 15/121* (2013.01)
 USPC .......... 244/131; 244/130; 244/119; 277/644; 277/650

(58) Field of Classification Search
 CPC ....... F16J 15/021; F16J 15/022; F16J 15/128; F16J 15/121; B64C 1/069; B64C 7/00
 USPC .......... 244/131, 130, 119; 277/637, 644, 650, 277/654, 316
 See application file for complete search history.

(56) References Cited

U.S. PATENT DOCUMENTS

| | | | |
|---|---|---|---|
| 4,507,011 A | 3/1985 | Brown | |
| 4,556,592 A | 12/1985 | Bannink, Jr. | |
| 5,014,934 A | 5/1991 | McClaflin | |
| 5,045,635 A * | 9/1991 | Kaplo et al. | 174/354 |
| 5,202,536 A * | 4/1993 | Buonanno | 174/356 |
| 6,258,431 B1 * | 7/2001 | Reis et al. | 428/63 |
| 6,655,635 B2 | 12/2003 | Maury et al. | |
| 6,723,916 B2 * | 4/2004 | Flaherty et al. | 174/376 |
| 7,850,119 B2 * | 12/2010 | Hernandez | 244/131 |
| 8,177,169 B2 * | 5/2012 | Lobo Barros et al. | 244/131 |

* cited by examiner

*Primary Examiner* — J. Woodrow Eldred
(74) *Attorney, Agent, or Firm* — Yee & Associates, P.C.

(57) ABSTRACT

A method and apparatus comprising an adhesive layer and a conductive elastic material layer. The adhesive layer is capable of being placed in a channel for a joint. The adhesive layer is capable of resuming an original shape after being deformed. A conductive elastic material layer is on the adhesive layer. The coating covers the conductive elastic material layer and is capable of resuming the original shape after being deformed.

21 Claims, 4 Drawing Sheets

ELASTIC AIRCRAFT JOINT FAIRING

BACKGROUND INFORMATION

1. Field

The present disclosure relates generally to aircraft and, in particular, to structural joints in an aircraft. Still more particularly, the present disclosure relates to a method and apparatus for providing a smooth physical and electrical surface over a joint on an aircraft.

2. Background

It is desirable for the surface or moldline of an aircraft to be smooth and electrically sealed to prevent electromagnetic interference (EMI) with internal electrical systems. A smooth surface helps reduce drag on an aircraft. Joints, at which parts of an aircraft meet, may have gaps. These gaps may cause an increase in drag. These gaps may also allow ambient electromagnetic energy to the aircraft to penetrate the aircraft skin and interfere with aircraft electronics. These gaps may be reduced through the use of fairings. A fairing is a structure that produces a smooth surface. Fairings are typically used at joints to cover gaps and provide a physically smooth surface and an electromagnetic interference seal at the joint.

Currently, fairings may be formed over on a joint by applying a rubber compound and an electrically conductive paint over a physical joint on the aircraft. It is desirable that a material for these rubber compounds and conductive paints may be capable of withstanding the strain that may be applied to these compounds in the joint during flight at low temperatures and/or other flight conditions.

With current materials, fairings for joints may have to be removed and/or repaired on some regular basis. Also, until a fairing can be repaired and/or replaced, the drag that may be caused may reduce the performance of the aircraft. This reduction in performance also may result in an increase in fuel usage causing the expense of operating the aircraft to increase. Having to remove and/or repair fairings also may take the aircraft out of service for some period of time with a corresponding increase in maintenance costs.

Accordingly, a need is present for a method and apparatus that takes into account some of the issues described above, as well as possible other issues.

SUMMARY

In one advantageous embodiment, an apparatus comprises an adhesive layer and a conductive elastic material layer. The adhesive layer is capable of being placed in a channel for a joint. The adhesive layer is capable of resuming an original shape after being deformed. A conductive elastic material layer is on the adhesive layer. The coating covers the conductive elastic material layer and is capable of resuming the original shape after being deformed.

In another advantageous embodiment, an aircraft fairing system comprises an elastomeric adhesive layer, an elastic knit conductive layer, and an elastomeric coating. The elastic knit conductive layer is on the elastomeric adhesive layer, and the elastomeric coating is on the elastic knit conductive layer.

In yet another advantageous embodiment, a method is present for installing a fairing. A joint with a channel is identified. The fairing is bonded in the channel in the joint. The fairing comprises an adhesive layer capable of resuming an original shape after being deformed. The fairing also comprises a conductive elastic material layer on the adhesive layer. A coating covers the conductive elastic material layer and is capable of resuming the original shape after being deformed.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
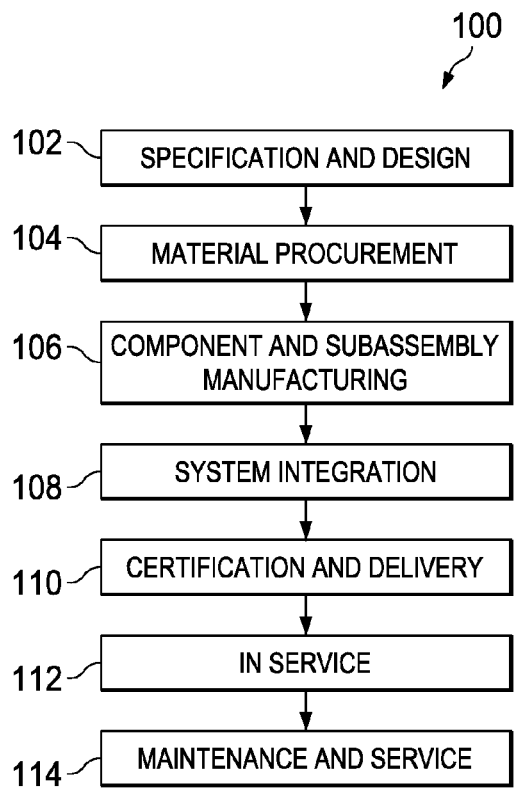
FIG. 1 is a diagram illustrating an aircraft manufacturing and service method in accordance with an advantageous embodiment.
Figure 2:
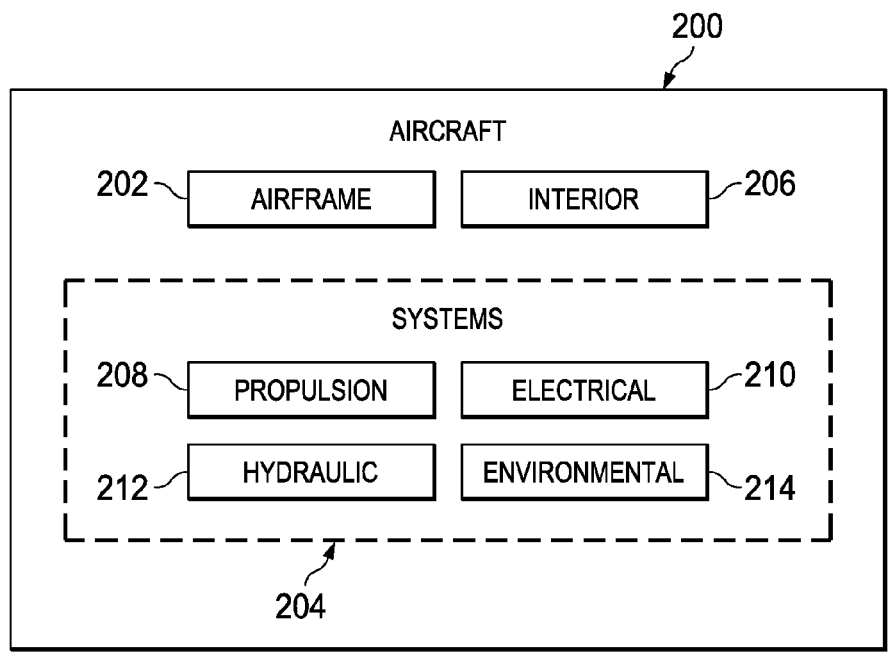
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

As an example, different advantageous embodiments may be implemented during component and subassembly manufacturing 106 in FIG. 1 to provide fairings to cover joints and provide electromagnetic interference shielding for joints for different portions of aircraft 200 in FIG. 2. As another example, different advantageous embodiments also may be employed during maintenance and service 114 in FIG. 1 to repair fairings on joints as well as retrofit or replace fairings on joints.

The different advantageous embodiments recognize and take into account that currently available fairings may not be able to provide an aerodynamically smooth outer moldline or surface for an aircraft without requiring replacement or repair of the fairings. The different advantageous embodiments also recognize and take into account that it would be desirable to have a fairing that may reduce the frequency at which the fairing may need to be replaced and/or repaired.

Further, the different advantageous embodiments also recognize and take into account that it may be desirable to have a fairing that also provides an electromagnetic interference seal over structural joints of an aircraft. The different advantageous embodiments recognize and take into account that the fairing used may be one that is capable of maintaining a smooth surface for the aircraft under a range of joint strains and/or temperatures that may result during flight.

The different advantageous embodiments recognize and take into account that an overcoat paint may be used for providing the electromagnetic interference seal over a joint. The different advantageous embodiments recognize and take into account that an overcoat paint may crack and/or peel. This occurrence may result in a loss of the electromagnetic interference sealing during flight in response to normal use with the strain on the fairing that occurs during normal flight. This type of cracking and/or peeling in the overcoat paint and/or the fairing may also occur more frequently at low temperatures, such as temperatures lower than around −40 degrees Fahrenheit.

Thus, the different advantageous embodiments provide an elastic aircraft structural joint fairing that is formed from a multi-layer system that covers the outer moldline of joints on the skin or outer surface of the aircraft. The different advantageous embodiments provide a fairing that is elastic. In other words, the fairing is capable of deforming and returning to an original shape or substantially the original shape when a deformation force is removed from the fairing. Further, in some advantageous embodiments, the fairing also provides an electromagnetic interference (EMI) seal over the aircraft joint that may be maintained under a range of joint strains that may occur during flight.

The different advantageous embodiments provide an apparatus that has an adhesive layer capable of being placed in a channel for a joint. The adhesive layer is capable of resuming an original shape after being deformed. A conductive elastic material layer is located over the adhesive layer. This conductive elastic material layer may provide an electromagnetic interference seal for the joint. The coating covers the elastic material. The coating also is capable of resuming the original shape after being deformed. These components, as well as possible others, may form a fairing system.

Figure 3:
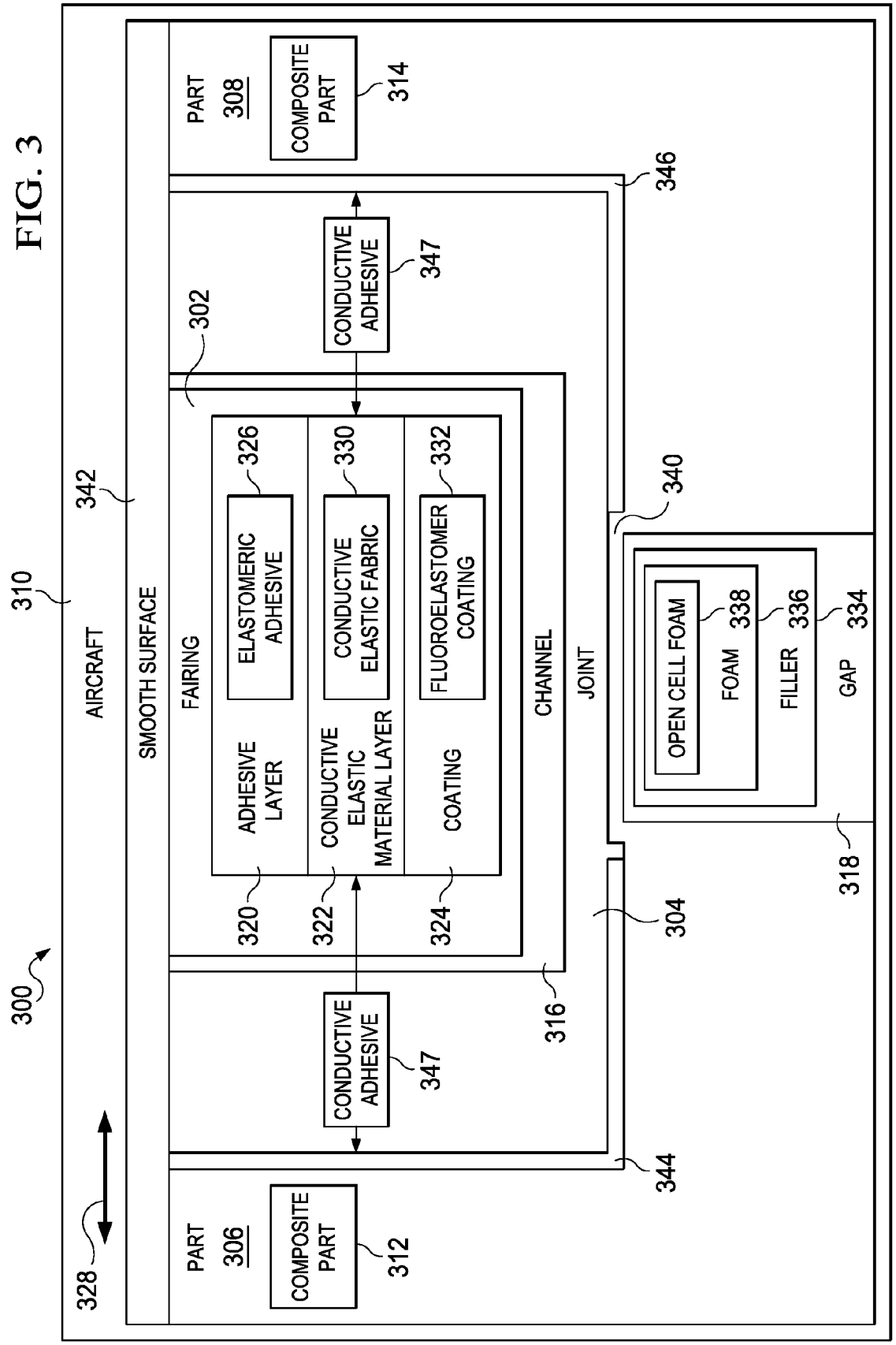
FIG. 3 is a diagram of a fairing system in accordance with an advantageous embodiment.

With reference now to FIG. 3, a diagram of a fairing system is depicted in accordance with an advantageous embodiment. In this example, fairing system 300 is an example of a fairing system that may be installed in aircraft 200 to provide a cover or seal for joints on the surface of aircraft 200 in FIG. 2.

In this illustrative example, fairing system 300 includes fairing 302, which may cover joint 304 formed by part 306 and part 308 in aircraft 310. Part 306 takes the form of composite part 312, and part 308 takes the form of composite part 314 in these examples. More specifically, composite part 312 and composite part 314 may be composite skin for an aircraft, such as aircraft 200 in FIG. 2. Of course, in other advantageous embodiments, these parts may be comprised of other types of materials such as, for example, aluminum, metal alloy, or some other suitable material.

In this depicted example, fairing 302 is located in channel 316 in joint 304. Gap 318 is present in channel 316 between part 306 and part 308. Fairing 302 may have adhesive layer 320, conductive elastic material layer 322, and coating 324. Conductive elastic material layer 322 is located on adhesive layer 320 in this example. Coating 324 is located on conductive elastic material layer 322.

In this illustrative example, adhesive layer 320 may be formed from various materials. For example, adhesive layer 320 may be elastomeric adhesive 326. Elastomeric adhesive 326 is a synthetic adhesive that may be formed from a polymer with a property of elasticity. Examples of these materials include, without limitation, adhesives based on fluorosilicone, polysulfide, polythioether elastomeric polymers, and/or other suitable materials.

Of course, any elastomeric adhesive may be selected that is capable of withstanding strains and temperatures that may be encountered by joint 304 during flight. In these examples, these strains may be horizontal strains relative to channel 316 along the directions of arrow 328. These strains may be tensile and/or compressive strains that may stretch and/or compress fairing 302 when installed in channel 316 in joint 304. The strains may be caused by movement and/or forces on part 306 and part 308.

Conductive elastic material layer 322 may be implemented using conductive elastic fabric 330. Conductive elastic fabric 330 may be, for example, without limitation, an elastic fabric with a metal coating. This elastic fabric may be a knit fabric that is capable of stretching. The metal coating may be a silver coating in these examples. As another example, conductive elastic material layer 322 may be comprised of elastomers filled with micro-scale conductive wires.

Of course, conductive elastic material layer 322 may be selected from any material or composition that is capable of withstanding strains that may occur across joint 304 during flight. These strains include those in the directions of arrow 328.

Coating 324 may take the form of fluoroelastomer coating 332. Fluoroelastomer coating 332 is a polymer containing fluorine. This polymer may be used in fluoroelastomer coating 332 to provide a smooth surface and maintain characteristics at low temperatures. Coating 324 covers conductive elastic material layer 322 and is capable of keeping its shape and resuming an original shape after being deformed. Fluoroelastomer coating 332 may be capable of desirable elasticity for temperatures around −65 degrees Fahrenheit.

Further, this coating also may provide resistance to various aircraft fluids such as, for example, without limitation, hydraulic fluid, oils, cleaning materials, fuel, deicing liquids, and other aircraft fluids. This example, however, is not meant to imply limitations to the form of coating 324. Other types of coatings may be used that are capable of maintaining elasticity and a smooth surface over desired operating conditions.

Additionally, fairing system 300 also may include filler 334 in gap 318. Filler 334 may be comprised of any material capable of filling gap 318. Further, filler 334 may support adhesive layer 320 during curing of adhesive layer 320. Filler 334 may prevent bending and/or bulging of adhesive layer 320 into gap 318. Filler 334 also may be selected such that filler 334 does not bulge upwards into adhesive layer 320 when gap 318 decreases in size and/or changes shape. In this example, filler 334 takes the form of foam 336. Filler 334 may be placed into gap 318 prior to the installation of fairing 302.

Foam 336 may be, for example, open cell foam 338. Of course, other types of foams may be used including, for example, a closed cell foam. Foam 336 may provide a support for elastomeric adhesive 326 during curing of elastomeric adhesive 326. Foam 336, in these examples, may not deform under compression that may occur due to loading and/or strain that may be applied to joint 304.

Also, in the different advantageous embodiments, gap 318 may have beveled edge 340. Beveled edge 340 reduces the mechanical strain in fairing 302 by increasing the area of fairing 302 that is strained. Beveled edge 340 may be present when part 306 and part 308 are manufactured. In some advantageous embodiments, beveled edge 340 may be machined into gap 318.

Fairing 302 may be manufactured as a part or patch to be placed into channel 316. When applied as a patch, filler 334 may be placed into gap 318. Fairing 302 may then be placed into channel 316, and adhesive layer 320 may be cured to bond fairing 302 in channel 316 to joint 304. As a result, smooth surface 342 may be created for joint 304.

Additionally, conductive elastic material layer 322 may provide electrical contact with metal layer 344 on part 306 and metal layer 346 on part 308. Conductive elastic material layer 322 provides an electromagnetic interference seal when in electrical contact with metal layer 344 and metal layer 346. Continuity between conductive elastic material layer 322 and metal layers 344 and 346 may be ensured by the use of conductive adhesive 347 between these components at the edges of conductive elastic material layer 322. Of course, paint, or some other coating, also may be placed over fairing 302 in joint 304, part 306, and part 308.

The illustration of fairing system 300 in FIG. 3 is not meant to imply physical or architectural limitations to the manner in which different advantageous embodiments may be implemented. Other components in addition to, or in place of, the ones illustrated may be employed. Further, in some advantageous embodiments, some of the illustrated components may be omitted.

For example, in some advantageous embodiments, filler 334 may be unnecessary if elastomeric adhesive 326 is not expected to bulge or bend into gap 318. As yet another illustrative example, in some advantageous embodiments, a coating, similar to coating 324, may be present between adhesive layer 320 and conductive elastic material layer 322. This coating may provide additional capability for conductive elastic material layer 322 to adhere to elastomeric adhesive 326.

Figure 4:
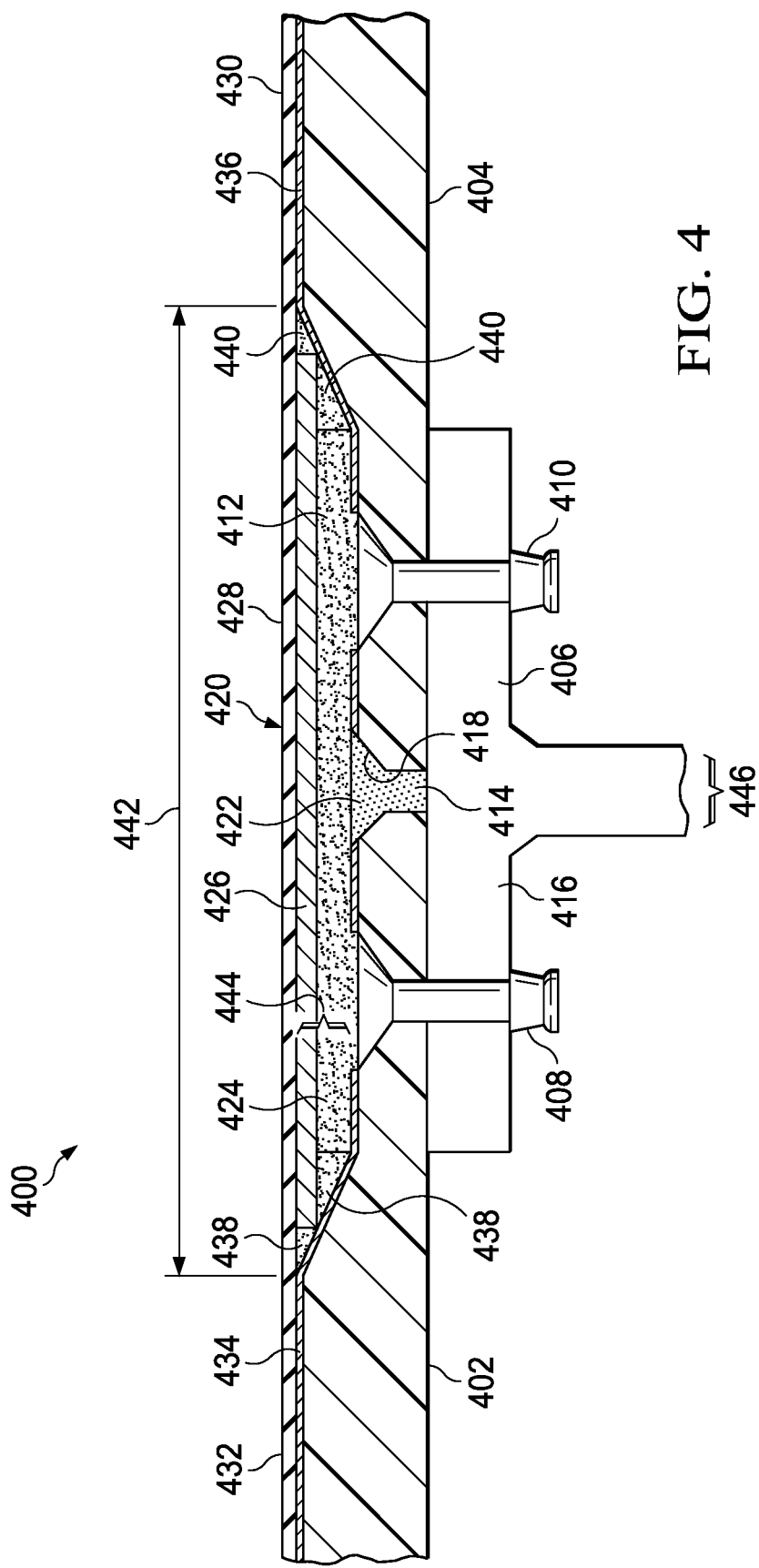
FIG. 4 is a diagram of a fairing system in accordance with an advantageous embodiment.

With reference now to FIG. 4, a diagram of a fairing system is depicted in accordance with an advantageous embodiment. Fairing system 400 is an example of one implementation of fairing system 300 in FIG. 3.

In this illustrative example, composite skin 402 and composite skin 404 are joined to spar 406 using fasteners 408 and 410. Composite skin 402 and composite skin 404 are configured to form channel 412 when joined to spar 406.

As can be seen in this illustrative example, gap 414 is present in joint 416. Gap 414 has beveled edge 418. Beveled edge 418 may be formed as part of composite skin 402 and composite skin 404, or may be machined into composite skin 402 and composite skin 404. In this example, fairing 420 is bonded to joint 416 in channel 412. Fairing 420, in this illustrative example, has elastomeric adhesive layer 424, elastic knit conductor layer 426, and fluoroelastomer coating 428.

Prior to the placement of fairing 420 into channel 412, open cell foam 422 is placed into gap 414 as a filler.

Fairing 420 may be placed into channel 412 and bonded to joint 416 by curing elastomeric adhesive layer 424 in fairing 420. In this manner, smooth surface 430 may be provided for joint 416. Another coating, such as paint 432, may be applied over fluoroelastomer coating 428.

In some advantageous embodiments, fairing 420 may be installed in pieces and/or in stages. For example, open cell foam 422 may be cut to shape or mixed from liquid components and placed into gap 414. Elastomeric adhesive layer 424 may be laid up into channel 412. Elastic knit conductor layer 426 may then be placed onto elastomeric adhesive layer 424. Fluoroelastomer coating 428 may then be sprayed or otherwise applied onto elastic knit conductor layer 426 to complete fairing 420. Open cell foam 422 may be considered to be part of fairing 420. In other advantageous embodiments, open cell foam 422 may only be considered a component that is used in conjunction with fairing 420.

In these illustrative examples, fairing 420 also may provide electromagnetic interference shielding for joint 416. Metal layer 434 is present on composite skin 402, and metal layer 436 is present on composite skin 404. Elastic knit conductor layer 426 electrically connects metal layer 434 with metal layer 436. Elastic knit conductor layer 426 contacts metal layer 434 at conductive adhesive 438 and contacts metal layer 436 at conductive adhesive 440. Conductive adhesives 438 and 440 ensure electrical continuity between elastic knit conductor layer 426 and metal layers 434 and 436.

The different components in fairing 420 may be selected to be capable of withstanding strains that may be applied to fairing 420 in joint 416. In these examples, elastic knit conductor layer 426 is capable of stretching around 30 percent. Of course, the amount of stretching or elasticity may depend on the particular implementation and/or strain present for joint 416. Elastomeric adhesive layer 424 and fluoroelastomer coating 428 may be selected to be capable of maintaining desirable elasticity at temperatures around −65 degrees Fahrenheit or less. Of course, these materials may be selected for other temperatures, depending on the particular implementation.

Fairing 420 may have width 442. Width 442 may be around four inches. Fairing 420 may have depth 444. In these examples, depth 444 may be around 0.030 inches. The length of fairing 420 may run the length of joint 416. Gap 414 may have width 446, which may be around 0.08 inches. The thickness of elastic adhesive 424 may be from around 0.010 inches to around 0.015 inches. The thickness of elastic knit conductor 426 is around 0.016 inches. The thickness of elastomer coating 428 is around 0.030 inches. The thickness of the metal coating is around 0.002 inches. Beveled edge 418 is around 45 degrees with a typical depth of around 0.125 inches to around 0.200 inches.

Figure 5:
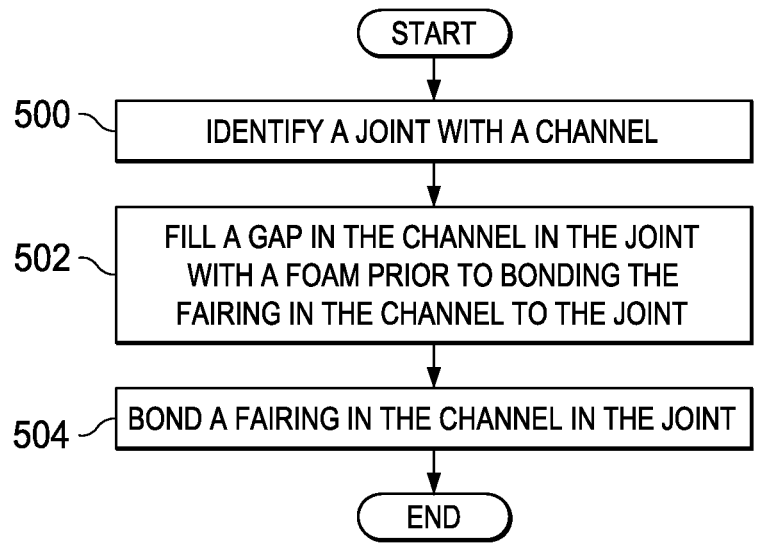
FIG. 5 is a flowchart of a process for installing a fairing in a joint in accordance with an advantageous embodiment.

With reference now to FIG. 5, a flowchart of a process for installing a fairing in a joint is depicted in accordance with an advantageous embodiment. The process illustrated in FIG. 5 may be implemented using fairing system 300 in FIG. 3.

The process begins by identifying a joint with a channel (operation 500). The process may fill a gap in the channel in the joint with a foam prior to bonding the fairing in the channel to the joint (operation 502). The process then bonds a fairing in the channel in the joint (operation 504), with the process terminating thereafter.

The fairing bonded into the channel, in this example, comprises an adhesive layer capable of resuming an original shape after being deformed, a conductive elastic material layer on the adhesive layer, and a coating covering the conductive elastic material layer, wherein the coating is capable of resuming the original shape after being deformed. The coating may provide a smooth surface for the joint.

Figure 6:
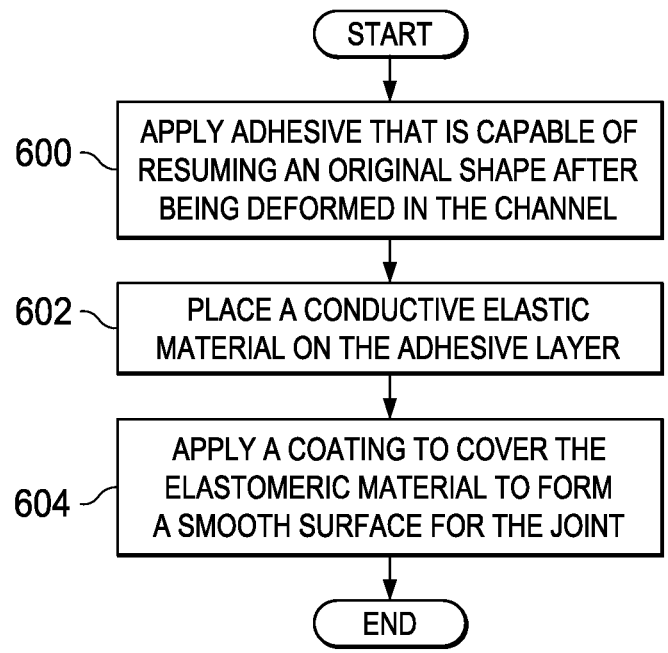
FIG. 6 is a flowchart of a process for bonding a fairing in a channel of a joint in accordance with an advantageous embodiment.

With reference now to FIG. 6, a flowchart of a process for bonding a fairing in a channel of a joint is depicted in accordance with an advantageous embodiment. The process illustrated in FIG. 6 is an example of one implementation for bonding of fairing in a channel in a joint. This process is a more detailed illustration of one implementation of operation 504 in FIG. 5.

The process begins by applying adhesive that is capable of resuming an original shape after being deformed in the channel (operation 600). This adhesive may be, for example, an elastomeric adhesive.

The process places a conductive elastic material on the adhesive layer (operation 602). The process then applies a coating to cover the elastomeric material to form a smooth surface for the joint (operation 604), with the process terminating thereafter.

The illustration of these operations is not meant to limit the manner in which bonding may be performed in different advantageous embodiments. Some operations may be performed concurrently, while other operations may be performed in different orders. Additionally, some operations may be omitted. As one example, operation 502 in FIG. 5 may be omitted, depending on the particular implementation.

As another example, in other advantageous embodiments, the fairing may be bonded as a patch in which the patch contains the adhesive layer, the conductive elastic material, and the coating. This patch may be placed into the channel, and the adhesive may be cured to bond the fairing in the channel to the joint. Further, in some advantageous embodiments, operations may be performed to expose edges of the conductive elastic material to provide a capability to make an electrical contact with metal coatings on the surface of the parts.

In one example, an elastic fairing was strained to 30 percent (joint strain) 20 times at room temperature and 10 times at −65 degrees Fahrenheit with no evidence of degradation in the fairing. The conventional fairing with rubber and conductive paint failed after one cycle at room temperature.

Thus, the different advantageous embodiments provide a method and apparatus for a fairing system. The fairing system may include an adhesive layer capable of being placed in a channel for a joint. The adhesive layer is capable of resuming an original shape after being deformed. The fairing system also may have a conductive elastic material on the layer of adhesive.

A coating may cover the conductive elastic material in which the coating is also capable of resuming an original shape after being deformed. Further, a filler, such as a foam, also may be placed into a gap in the joint. This gap also may have a beveled edge. The different advantageous embodiments may provide a smooth surface to reduce drag that may otherwise be present over the joint. Further, the conductive elastic material may be an electrical contact between conductive metal layers on the parts. This contact may provide an electromagnetic interference shield for the joint.

Through the selection of the different layers and materials, one or more different advantageous embodiments may provide an elastomeric or stretchable fairing that may withstand strains or tensions applied to a joint during flight. Further, the fairing, in the different advantageous embodiments, also may be capable of withstanding temperatures that may allow the fairing to require less maintenance as compared to other fairing systems currently available.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a first part;
   a second part located adjacent to the first part to form a joint, the joint comprising a channel;
   an adhesive layer placed in the channel, wherein the adhesive layer is configured to resume an original shape after being deformed;
   a conductive elastic material layer covering the adhesive layer; and
   a coating covering the conductive elastic material layer, wherein the coating is configured to resume the original shape after being deformed, the coating providing a smooth outer surface for the joint.

2. The apparatus of claim 1, wherein the joint further comprises a gap between the first part and the second part, and the apparatus further comprises:
   a foam located in the gap, the adhesive layer covering the foam.

3. The apparatus of claim 1 further comprising:
   a first metal layer on a surface of the first part; and
   a second metal layer on a surface of the second part, wherein the conductive elastic material layer is electrically connected to the first metal layer and the second metal layer.

4. The apparatus of claim 1, wherein the conductive elastic material layer is selected from one of a conductive elastic fabric, an elastic fabric with a metal coating, and a knit fabric with a metallic coating.

5. The apparatus of claim 1, wherein the adhesive layer is an elastomeric adhesive layer.

6. The apparatus of claim 2, wherein the foam is selected from one of an open cell foam and a closed cell foam.

7. The apparatus of claim 2, wherein the foam provides support to the conductive elastic material layer.

8. The apparatus of claim 2, wherein the foam does not deform an outer surface of the coating when the foam is under compression.

9. The apparatus of claim 1, wherein
the first part comprises a composite material and wherein;
the second part comprises a composite material.

10. The apparatus of claim 2 wherein the gap has a beveled edge.

11. The apparatus of claim 1, wherein the adhesive layer, the conductive elastic material layer, and the coating form a fairing covering an outer moldline of the joint, wherein the joint is on an outer surface of an aircraft.

12. The apparatus of claim 1 further comprising:
a vehicle, wherein the joint is located on the vehicle.

13. The apparatus of claim 12, wherein the vehicle is selected from one of a mobile platform, an aircraft, a surface ship, a tank, a personnel carrier, a train, a spacecraft, a submarine, a bus, and an automobile.

14. A method for installing a fairing, the method comprising:
identifying a joint with a channel; and
bonding the fairing in the channel in the joint, wherein the fairing comprises an adhesive layer configured to resume an original shape after being deformed, a conductive elastic material layer on the adhesive layer, and a coating covering the conductive elastic material layer, wherein the coating is configured to resume the original shape after being deformed.

15. The method of claim 14 further comprising:
filling a gap in the channel in the joint with a foam prior to bonding the fairing in the channel to the joint.

16. The apparatus of claim 1, wherein the coating is a fluoroelastomer coating.

17. The apparatus of claim 1, wherein the adhesive layer is from around 0.010 inches to around 0.015 inches in thickness.

18. The apparatus of claim 1, wherein the conductive elastic material layer is around 0.016 inches in thickness.

19. The apparatus of claim 1, wherein the coating is around 0.030 inches in thickness.

20. The apparatus of claim 1, wherein the adhesive layer and the coating are selected to be capable of maintaining a desirable elasticity at temperatures around −65 degrees Fahrenheit or less.

21. The apparatus of claim 10, wherein the foam is configured to fill a space defined by the beveled edge.

* * * * *